March 17, 1959 J. W. CHRISTENSEN 2,878,309
APPARATUS FOR MAKING MOTION PICTURES OF REPRODUCTIONS
IN FIELD SEQUENTIAL COLOR TELEVISION SYSTEMS
Filed June 10, 1955 2 Sheets-Sheet 1

INVENTOR.
JOHN W. CHRISTENSEN
BY
Campbell, Brumbaugh, Free & Graves

INVENTOR.
JOHN W. CHRISTENSEN
BY
Campbell, Brumbaugh, Free & Graves

United States Patent Office 2,878,309

Patented Mar. 17, 1959

2,878,309

APPARATUS FOR MAKING MOTION PICTURES OF REPRODUCTIONS IN FIELD SEQUENTIAL COLOR TELEVISION SYSTEMS

John W. Christensen, Forest Hills, N. Y., assignor to Columbia Broadcasting System, Inc., New York, N. Y., a corporation of New York Application June 10, 1955, Serial No. 514,572

4 Claims. (Cl. 178—5.4)

The present invention relates to methods and apparatus for making colored motion pictures of colored images produced by color television systems and the like. More specifically, it has to do with novel methods and apparatus capable of utilizing conventional color motion picture equipment for making colored motion pictures of images formed in so-called "field sequential" color television systems in a simple yet highly effective manner.

"Field sequential" color television systems of the type disclosed in an article entitled "Color Television U. S. A. Standard," by Goldmark, Christensen and Reeves, appearing at pages 1288–1313 of the October, 1951 issue of the Proceedings of the I. R. E., have given excellent results in practice. In such systems, the image of a colored object is reproduced by a standard black and white picture tube in the form of successive images in black and white representing red, blue and green color separations, respectively, of the original object. When these images are viewed successively through corresponding red, blue and green color filters moving in synchronism with the field scanning rate, they appear to fuse into a composite full color image. A double interlaced scanning pattern is employed and successive fields correspond to red, blue and green aspects of the object field in regularly recurring sequence, the field scanning rate being 144 fields per second.

When it is desired to make colored motion pictures of the images produced in a field sequential color television system with conventional motion picture film equipment, difficulties arise because of the wide difference between the television system field scanning rate (144 fields per second) and the frame exposure rate in the movie camera (24 frames per second).

It is an object of the invention, accordingly, to provide novel and highly effective methods and apparatus for making colored moving pictures of the colored images produced in a field sequential color television system.

Another object of the invention is to provide new and improved methods and apparatus of the above character enabling conventional color moving picture camera equipment to be used without material change for taking colored pictures of field sequential color television images.

These and other objects of the invention are attained by operating conventional color motion picture camera means in synchronism with the field scanning rate of a field sequential color television system such that each film frame, while stationary, is exposed to a substantially complete color sequence of fields required for a complete color picture. At least one field immediately following the fields in this sequence is rendered ineffective to expose the film and pulldown of the film is effected during this time.

In a system of the type described in the aforementioned publication having a field scanning rate of 144 fields per second, each film frame is exposed to a sequence of fields one less in number than the total required for a complete color picture. One blue field in each sequence is rendered ineffective to expose the film and film pulldown is effected at that time. Thus, one full field (60° of the film camera operating cycle) in each sequence is available for pulldown. Since color motion picture cameras capable of pulldown in as little as 28° are available commercially, the pulldown requirements of the proposed apparatus can easily be met.

The blue field conveys the least picture information of the three primary colors and the color film usually employed requires a blue correction so that the loss of one blue field in each sequence does not seriously affect the color rendition in the motion picture produced.

Where the field scanning rate is 180 fields per second, as it is in certain applications, successive film frames are exposed to sequences of odd and even red, blue and green color fields representing complete color pictures, a field of one primary color between two adjoining sequences and two fields of the other two primary colors immediately following the second sequence being rendered ineffective to expose the film. Film pulldown is caused to take place during the occurrence of these intervening fields. Since each film frame is exposed to a complete sequence of color fields representing a color picture, it will be apparent that the proper color balance will obtain in the resulting motion picture, in spite of the fact that three color fields are lost for every two film frames that are exposed.

The invention may be better understood from the following detailed description of several representative embodiments thereof, taken in conjunction with the accompanying drawings, in which.

Figures 1, 2:
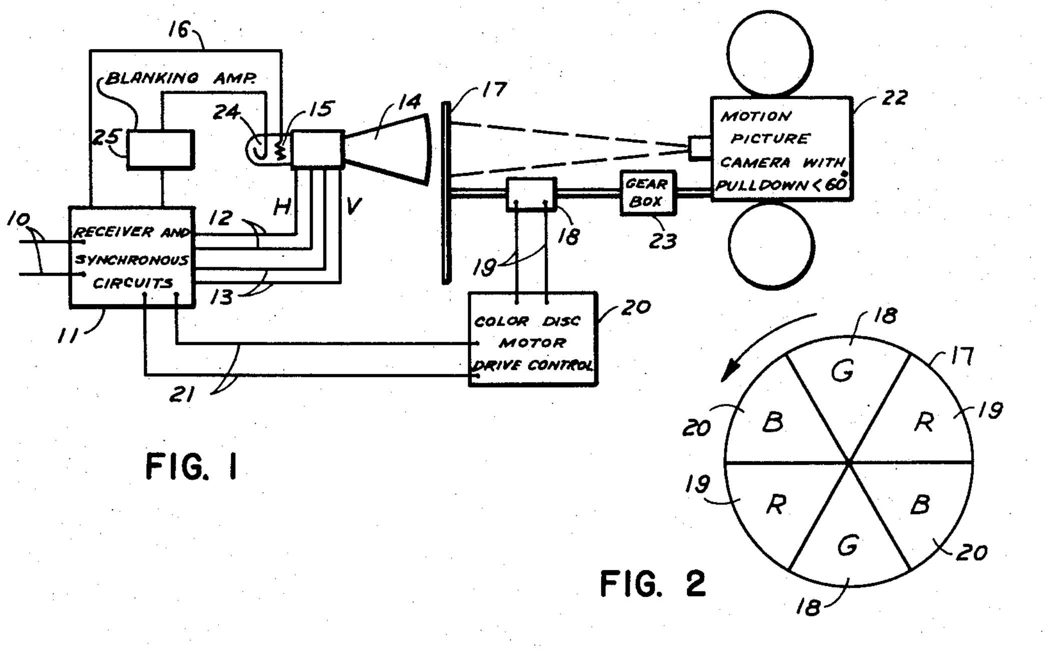
Fig. 1 is a schematic diagram of apparatus constructed according to the invention for making a colored motion picture record of colored images produced in a field sequential television system.
Fig. 2 illustrates a form of color filter device that may be used in the apparatus of Fig. 1.

Referring now to Fig. 1, field sequential signals from any suitable source such as a field sequential transmitter in a closed television circuit, for example, are supplied over the conductors 10 to conventional receiver and synchronizing circuits 11. The field sequential system in which the signals are produced may be of the type disclosed in Goldmark Patent No. 2,480,571, granted August 30, 1949, with a field scanning frequency of 144 fields per second, for example, each frame being scanned in two interlaced fields of 202½ lines each and successive fields representing the primary colors red, green and blue. In such a system, a complete color picture is constituted by a sequence of six fields, viz., three odd red, green and blue fields, and three even red, green and blue fields.

The receiver and synchronizing circuits 11 are adapted to provide horizontal and vertical deflection signals over the conductors 12 and 13, respectively, to a conventional black and white television picture tube 14, the control grid 15 of which also receives field sequential video signals over the conductor 16.

Disposed in front of the viewing face of the picture tube 14 is the usual color filter disc 17 which may be of the type disclosed in the prior Goldmark Patent No. 2,304,081, issued December 8, 1942. The color filter disc 17 is adapted to be driven by a motor 18 energized through the conductors 19 by color disc motor drive control mechanism 20 which also receives synchronizing signals from the receiver and synchronizing circuits 11 through the conductors 21. The motor drive control mechanism 20 serves to maintain the color filter disc 17 synchronized with the field scanning rate and it may be, for example, of the type disclosed in the Patent No. 2,645,678 to Christensen.

The color filter disc 17 (Fig. 2) is provided with a plurality of light transmitting segments 18, 19 and 20 which are adapted to transmit green, red and blue light, respectively. As is well known, when the disc 17 is maintained in synchronism with the field scanning rate, the successive images produced on the face of the television picture tube 14, when viewed through the disc 17, appear to fuse into a composite color picture.

In order to make a motion picture record in color of the colored image viewed through the rotating color filter disc 17, a conventional motion picture film camera 22 is positioned in front of the picture tube 14 so as to view the colored images thereon and is synchronized with the color filter disc 17. To this end, the drive mechanism for the motion picture camera 22 may be coupled through a suitable gear box 23 to the drive motor 18 for the filter disc 17.

According to the invention, the motion picture camera 22 is so synchronized with respect to the movement of the color filter disc 17 that film pulldown in the former occurs during the passage of a blue segment 20 (Fig. 2) in front of the picture tube 14, at which time a monochrome image representing part of the blue in the original picture appears on the face of the tube 14. Thus, in Fig. 2, this image corresponds to the even blue field $B_e$. Further, means is provided for rendering this blue image ineffective to expose the color film in the camera 22. This may be accomplished, for example, by applying to the cathode 24 of the television picture tube 14 a blanking signal provided by a suitable blanking amplifier 25 supplied with an appropriate control signal from the receiver and synchronizing circuits 11.

Figure 3:
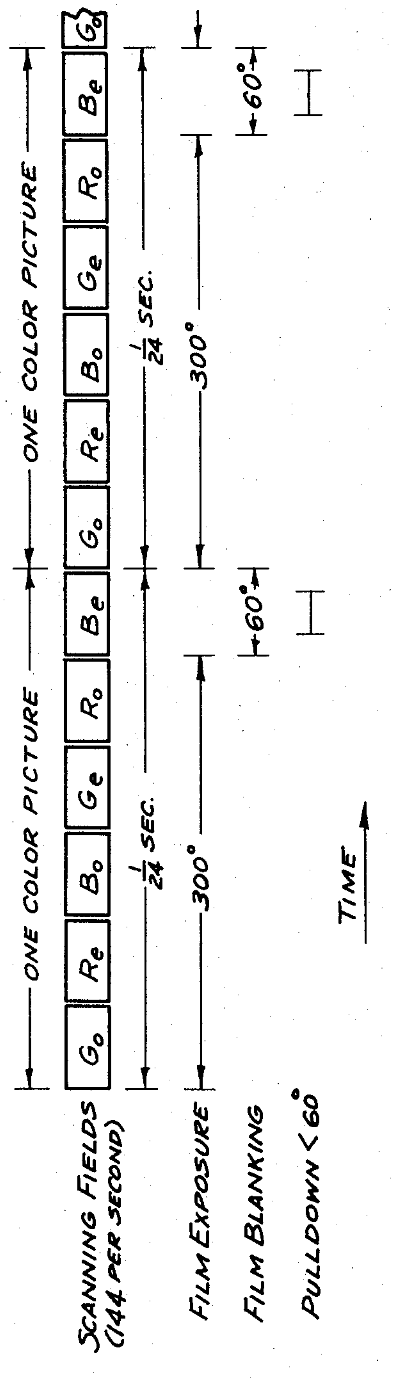
Fig. 3 is a graph illustrating a typical sequence of events in the apparatus of Fig. 1.

As best shown in Fig. 3, the blanking signal is applied to the cathode 24 of the picture tube 14 so as to completely blank out one blue field in every colored picture of six successive fields appearing on the face of the picture tube 14. Film pulldown in the camera 22 is arranged to occur during the blanking period. Under these conditions, the film will remain stationary for 300° of the camera operating cycle during which time a frame will be exposed to five successive colored fields viewed through the color filter disc 17. The sixth colored field (the even blue field $B_e$ in Fig. 3) will be blanked out during the remaining 60° of the camera operating cycle during which film pulldown occurs. It will be apparent, therefore, that pulldown in the motion picture film cameras 22 must take place in less than 60° of the camera operating cycle. Motion picture film cameras with pulldowns as low as 28° are commercially available, so that this requirement can easily be met.

Figures 4, 5:
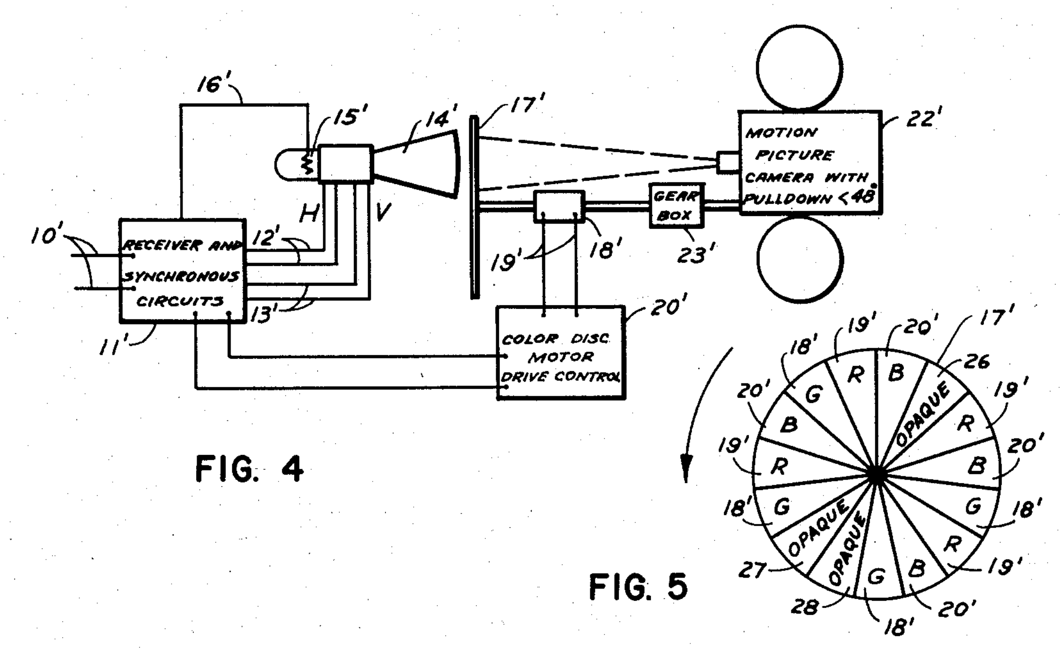
Fig. 4 illustrates a further embodiment of the invention.
Fig. 5 illustrates a form of color filter disc that may be used in the apparatus of Fig. 4.

In certain cases, it is convenient to use field sequential color television systems in which the field scanning rate is 180 fields per second. Apparatus suitable for making a motion picture record in color of images produced in such a system is shown in Fig. 4. The apparatus is quite similar to that shown in Fig. 1 and corresponding parts have been designated by corresponding primed reference characters. In this embodiment, the field sequential signal supplied to the receiver and synchronizing circuits 11' over the conductors 10' is the usual one produced in a field sequential system having a field scanning rate of 180 fields per second.

Figure 6:
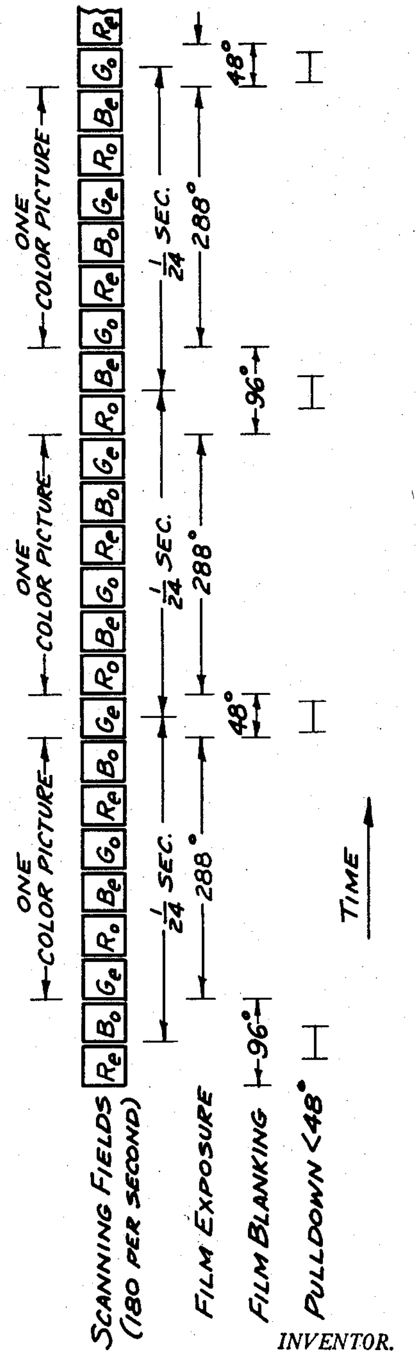
Fig. 6 is a graph illustrating a typical sequence of operations in the modification shown in Fig. 4.

One possible relation between the successive scanning fields and the exposure of the film in the motion picture camera 22' for effective operation is illustrated in Fig. 6. As there shown, the motion picture camera 22' (Fig. 4) is so synchronized with respect to the color filter disc 17' that one film frame remains stationary during 288° of the camera operating cycle during which the film is exposed to a full sequence of six successive color fields; the next succeeding color field (the even green $G_e$ field) is blanked out and film pulldown is effected at this time; the next film frame remains stationary for a further 288° of the camera operating cycle, while the next six successive fields representing another complete color picture are exposed; and the following two fields (the odd red $R_o$ and even blue $B_e$ fields) are blanked out, film pulldown again taking place during the blanking period. The sequence of operations then repeats itself.

In this sequence of operations, a blanking period of 48° is produced after exposure of a first film frame in each pair of adjacent frames and a blanking period of 96° is produced after exposure of the second film frame in the pair. Thus, any conventional motion picture camera capable of effecting pulldown in less than 48° may be employed.

Blanking may be effected in the same manner as in Fig. 1 or by providing opaque regions on the color filter disc 17' at the places where the color filters corresponding to the colored fields to be blanked would normally appear. Thus, the color wheel 17' may be divided into 15 segments (Fig. 5), 12 of which (designated by the reference characters 18', 19' and 20') are adapted to transmit green, red and blue light, respectively. The filter disc 17 is also provided with opaque portions 26, 27 and 28 which are suitably located so that the color sequence during rotation of the disc 17' will be in accordance with Fig. 6.

In the embodiment of Fig. 4, it will be noted (Fig. 6) that each film frame is exposed to a complete sequence of six color fields representing a complete color picture. Further, it will be appreciated that the loss of one even green field, one odd red field, and one even blue field for each two film frames exposed, will not materially affect the color rendition in the film record produced.

The invention thus provides novel and highly effective apparatus for making a colored motion picture record of colored images produced in a field sequential color television system. By exposing consecutive film frames to successive colored fields in the manner indicated, a colored motion picture record of good color rendition may be readily obtained with conventional motion picture camera apparatus and without defects such as "shadow bar" and the like.

The several specific embodiments described are obviously susceptible of modification in form and detail within the scope of the invention. For example, other means may be employed for rendering a particular color field ineffective to expose a colored film frame. Thus, the film camera shutter mechanism might be appropriately modified for this purpose. Also, the specific forms of blanking means shown in Figs. 1 and 5 may be used indifferently in either embodiment of the invention. The invention, therefore, is not to be restricted to the specific forms described herein but is defined in the following claims.

I claim:

1. In apparatus for making a motion picture record in color of monochrome images formed by a succession of double interlaced fields representing respectively components of different colors in a field sequential color television system, the combination of motion picture film camera means disposed to view said succession of fields, means interposed between said monochrome images and said camera means and synchronized with said fields for imparting said different colors to said respective monochrome images, means synchronizing said camera means with the rate of occurrence of said fields so that each film frame has a period of dwell at least as long as the time duration of a succession of color fields in which colored images of said fields are projected successively in exact registry on an image plane in said camera means, followed by a period of film pulldown of lesser duration than the time duration of one of said fields, and means synchronized with said camera means for rendering any field in which any part of a pulldown period occurs incapable of being recorded by said camera means.

2. In apparatus for making a motion picture record in color of monochrome images formed by a succession of fields representing the primary colors red, blue and green in a field sequential television system, the combination of motion picture film camera means disposed to view said fields, means interposed between said monochrome images and said camera means and synchronized with said fields for imparting said red, blue and green primary colors to said respective monochrome images, means synchronizing said camera means with the rate of occurrence of said fields so that each film frame has a period of dwell at least as long as the time duration of a succession of color fields one less in number than required for a complete picture in which colored images of said fields are projected successively in exact registry on an image plane in said camera means, followed by a period of pulldown of lesser duration than the time duration of one of said fields, said period of pulldown being concurrent with at least a portion of a blue field in said succession, and means synchronized with said camera means for rendering said blue field incapable of being recorded by said camera means.

3. In apparatus for making a motion picture record in color of monochrome images formed on the face of a television picture tube by a succession of fields corresponding to the primary colors red, blue and green in a field sequential television system, the combination of motion picture film camera means disposed to view said fields, a rotatable color filters member interposed in the optical path between said picture tube and said camera means having a plurality of red, blue and green light transmission portions and an opaque portion angularly spaced apart about the axis of rotation of said color filter member, means synchronizing said rotatable color filters member with the rate of occurrence of said fields so that said opaque portion renders one blue field in each sequence of fields representing a color picture incapable of being viewed by said camera means while said red, green, and blue light transmission portions are positioned in said optical path in coincidence with the appearance of the corresponding fields on the face of said picture tube so that colored images of said fields are projected successively in exact registry on an image plane in said camera means, and means synchronizing said camera means with the rate of occurrence of said fields so that each film frame has a period of dwell at least as long as the time duration of a succession of complete color fields one less in number than required for a complete picture, followed by a period of pulldown of lesser duration than the time duration of one of said fields, said period of pulldown being concurrent with at least a portion of said one blue field.

4. In apparatus for making a motion picture record in color of monochrome images formed by a succession of fields respresenting the primary colors red, blue and green in a field sequential television system, the combination of motion picture film camera means disposed to view said fields, means interposed between said monochrome images and said camera means and synchronized with said fields for imparting said red, blue and green primary colors to said respective monochrome images, means synchronizing said camera means with the rate of occurrence of said fields so that each film frame has a period of dwell at least as long as the time duration of a succession of complete color fields representing a complete picture so that colored images of said fields are projected successively in exact registry on an image plane in said camera means followed by a period of pulldown of lesser duration than the time duration of one of said fields, said period of pulldown being concurrent with at least a portion of a field of one color in said succession following one film frame and being concurrent with portions of at least two succeeding fields of different colors following the next adjacent frame, and means synchronized with said camera means for rendering said field of one color and said two succeeding fields of different colors incapable of being recorded by said camera means.

References Cited in the file of this patent

UNITED STATES PATENTS 2,600,868 Hales ---------------- June 17, 1952